(12) United States Patent
Sato et al.

(10) Patent No.: US 7,864,238 B2
(45) Date of Patent: Jan. 4, 2011

(54) SOLID-STATE IMAGING DEVICE, DRIVING METHOD THEREOF, CAMERA, AND DRIVING METHOD THEREOF

(75) Inventors: Maki Sato, Kanagawa (JP); Ryoji Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 866 days.

(21) Appl. No.: 11/821,014

(22) Filed: Jun. 21, 2007

(65) Prior Publication Data

US 2008/0012975 A1 Jan. 17, 2008

(30) Foreign Application Priority Data

Jul. 14, 2006 (JP) ............................ P2006-194429

(51) Int. Cl.
*H04N 5/335* (2006.01)
(52) U.S. Cl. ....................... 348/308; 348/241
(58) Field of Classification Search ................. 348/308, 348/294, 241; 250/208.1
See application file for complete search history.

(56) References Cited

U.S. PATENT DOCUMENTS

2004/0189845 A1* 9/2004 Kasuga et al. ............... 348/308
2007/0188642 A1* 8/2007 Agranov et al. ............. 348/308

FOREIGN PATENT DOCUMENTS

| JP | 04-32589 | 2/1985 |
| JP | 10-248035 | 9/1998 |
| JP | 2004-063498 | 2/2004 |
| JP | 2004-282552 | 10/2004 |
| JP | 2005-093554 | 4/2005 |
| JP | 2006-147964 | 6/2006 |

* cited by examiner

*Primary Examiner*—Tuan Ho
(74) *Attorney, Agent, or Firm*—Robert J. Depke; Rockey, Depke & Lyons, LLC

(57) ABSTRACT

A solid-state imaging device includes an imaging region having a plurality of pixels arranged. Each of the pixels includes a photoelectric converting portion and a charge converting portion for converting a charge generated by photoelectric conversion into a pixel signal. Further each pixel includes a first gate portion for charge accumulation and a second gate portion for charge readout that are formed between the photoelectric converting portion and a floating diffusion portion.

12 Claims, 7 Drawing Sheets

SOLID-STATE IMAGING DEVICE, DRIVING METHOD THEREOF, CAMERA, AND DRIVING METHOD THEREOF

CROSS REFERENCES TO RELATED APPLICATIONS

The present invention contains subject matter related to Japanese Patent Application JP 2006-194429 filed in the Japanese Patent Office on Jul. 14, 2006, the entire contents of which being incorporated herein by reference.

BACKGROUND OF THE INVENTION

1. Field of the Invention

The present invention relates to a solid-state imaging device, which is capable of extending a dynamic range, and a method of driving the solid-state imaging device; and a camera using such solid-state imaging device and a method of driving the camera. Particularly, the present invention relates to a solid-state imaging device, such as a CMOS image sensor, in which a pixel includes a charge converting portion for converting a charge generated by photoelectric conversion into a pixel signal, and a method of driving the solid-state imaging device; and a camera using such solid-state imaging device and a method of driving the camera.

The term "CMOS image sensor" used herein refers to as an image sensor produced by the application of or partially using the CMOS process. The solid-state imaging device may be formed of a single chip or a plurality of chips.

2. Description of the Related Art

CMOS image sensors and CCD image sensors have been known as solid-state imaging devices. In the solid-state imaging device, each pixel is configured to convert incident light into charge by photoelectric conversion and accumulate the charge, while reading out the accumulated charge as signal charge. The solid-state imaging device of this kind is typically provided with a blooming-preventing structure. The blooming-preventing structure is responsible for preventing the generation of blooming such that charge to be photo-electrically converted is overflowed and limited to a certain overflow level corresponding to the maximum amount of charge accumulated. However, if the maximum amount of charge accumulated is defined, it will restrict a dynamic range. In other words, output signal levels corresponding to the respective inputs of large amount of light that generates charge exceeding the overflow level are always equal to one another, thereby causing a loss of light-intensity information.

In order to extend the dynamic range, there is proposed a method in which an overflow level is changed from a low level to a high level in the middle of a charge accumulation period for each pixel and a Knee characteristic is then given to a relationship between light intensity and output signal. Japanese Unexamined Patent Application Publication No. 10-248035 (JP 10-248035 A) and Japanese Examined Patent Application Publication No. 4-32589 (JP 4-32589 B) disclose MOS solid-state imaging devices on which the method of changing overflow levels is applied. JP 10-248035 A proposes a method of raising an overflow level by ternary drive of readout voltage, while JP 4-32589 B proposes a method of raising an overflow level in the vertical direction by changing the voltage of a p-type semiconductor well region on a n-type substrate.

FIG. 1 shows an equivalent circuit used in an example of a unit pixel of a related-art CMOS solid-state imaging device. A unit pixel 100 includes a photodiode (PD) 101 provided as a photoelectric converting portion, and four MOS transistors including a transfer transistor 102, a reset transistor 103, an amplification transistor 104, and a selection transistor 105. The cathode of the photodiode 101 is connected to a gate of the amplification transistor 104 via the transfer transistor 102. A node electrically connected with the gate of the amplification transistor 104 is referred to as a floating diffusion portion FD. The floating diffusion portion FD includes the drain region of the transfer transistor 102.

The transfer transistor 102 is connected between the cathode of the photodiode 101 and the floating diffusion portion FD. In addition, a transfer pulse φTRG is applied to a gate of the transfer transistor 102 via a transfer wiring 107. The reset transistor 103 has a drain connected to a pixel power source line (Vdd) 109 and a source connected to the floating diffusion portion FD. In addition, a reset pulse φRST is applied to a gate of the transfer transistor 103 via a reset wiring 108.

The amplification transistor 104 has a gate connected to the floating diffusion portion FD, a drain connected to the pixel power source 109, and a source connected to a drain of the selection transistor 105. The selection transistor 105 has a source connected to a vertical signal line 106. In addition, a selection pulse φSEL is applied to a gate of the selection transistor 105 via a selection wiring 110.

In the pixel 100, prior to readout of charge accumulated in the photodiode 101, the reset transistor 103 is turned on to reset the floating diffusion portion FD to the voltage of the pixel power source. Then, the potential of the floating diffusion portion FD after the reset is read out to the vertical signal line 106. After that, the transfer transistor 102 is turned on to transfer signal charge accumulated in the photodiode 101 to the floating diffusion portion FD. Subsequently, the signal charge is converted into a pixel signal and then read out to the vertical signal line 106. The previous reset potential and the pixel signal are subjected to noise reduction through CDS processing in a CDS processing circuit of a column processing circuit and then outputted as a pixel signal.

SUMMARY OF THE INVENTION

In the case of the method disclosed in JP 10-248035 A, a supply-voltage generation circuit to cause three power sources may be needed. Thus, the area of the circuit will increase. In addition, in the case of the method disclosed in JP 4-32589 B, all pixels in one solid-stage imaging device simultaneously increase their overflow levels, so that the pixel may not be controlled individually and all of the pixels should have the same timings of initiating and terminating the charge accumulation. Therefore, in the case of using a CMOS image sensor that initiates light exposure on every pixel line, a lens shutter may be needed.

Furthermore, as a method of extending a dynamic range without causing a change in overflow level, there is a method of synthesizing both an image at the time of a short-time accumulation and an image at the time of a prolonged-time accumulation. However, the method has no other choice but to carry out an external DSP (Digital Signal Processing) processing because of the absence of the CDS (Correlated Double Sampling) processing.

It is desirable to provide a solid-state imaging device, which is capable of extending a dynamic range, and a method of driving the solid-state imaging device; and a camera using the solid-state imaging device and a method of driving the camera.

According to an embodiment of the present invention, there is provided a solid-state imaging device including an imaging region having a plurality of pixels arranged. Each of the pixels includes a photoelectric converting portion and a charge converting portion for converting a charge generated by photoelectric conversion into a pixel signal, in which a first gate portion for charge accumulation and a second gate portion for charge readout are formed between the photoelectric converting portion and a floating diffusion portion.

In the solid-state imaging device according the embodiment of the present invention, both the first gate portion for charge accumulation and the second gate portion for charge readout are formed between the photoelectric converting portion and the floating diffusion portion. Thus, the first gate portion can be driven in the middle of the charge accumulation period to form a charge accumulation area below the first gate portion. Therefore, the overflow level of the photoelectric converting portion substantially rises to increase a saturated amount of charge accumulated.

According to another embodiment of the present invention, there is provided a method of driving a solid-state imaging device including a plurality of pixels each of which includes a photoelectric converting portion and a floating diffusion portion. The method includes the steps of: forming a first gate portion for charge accumulation and a second gate portion for charge readout between the photoelectric converting portion and the floating diffusion portion; and actuating the first gate portion in the middle of a charge accumulation period of the pixel to increase an overflow level of the photoelectric converting portion and extend a dynamic range.

In the method of driving the solid-state imaging device according to another embodiment of the present invention, the first gate portion for charge accumulation and the second gate portion for charge readout are formed between the photoelectric converting portion and the floating diffusion portion, which form the pixel. The first gate portion is driven in the middle of the charge accumulation period of the pixel to be a charge accumulation area. Therefore, the overflow level of the photoelectric converting portion substantially rises to increase a saturated amount of charge accumulated in the middle of the charge accumulation period.

In the solid-state imaging device according to an embodiment of the present invention, the first gate portion and the second gate portion are formed between the photoelectric converting portion and the floating diffusion portion. Therefore, in the middle of the charge accumulation period of each pixel, a saturated amount of charge accumulated can be increased, thereby extending a dynamic range.

In the method of driving the solid-state imaging device according to an embodiment of the present invention, the first gate portion and the second gate portion are formed between the photoelectric converting portion and the floating diffusion portion. Therefore, a saturated amount of charge accumulated can be increased in the middle of the charge accumulation period of each pixel by driving the first gate portion, thereby extending a dynamic range.

According to further embodiment of the present invention, there is provided a camera including a solid-state imaging device that has an imaging region including a plurality of pixels arranged. Each of the pixels includes a photoelectric converting portion and a charge converting portion for converting a charge generated by photoelectric conversion into a pixel signal, and a first gate portion for charge accumulation and a second gate portion for charge readout are formed between the photoelectric converting portion and a floating diffusion portion.

According to further another embodiment of the present invention, there is provided a method of driving a camera including a solid-state imaging device having a plurality of pixels each including a photoelectric converting portion and a floating diffusion portion. The method includes the steps of: forming a first gate portion for charge accumulation and a second gate portion for charge readout between the photoelectric converting portion and the floating diffusion portion; and actuating the first gate portion in the middle of a charge accumulation period of the pixel to increase an overflow level of the photoelectric converting portion and extend a dynamic range.

DESCRIPTION OF THE PREFERRED EMBODIMENTS

Hereinafter, embodiments of the present invention will be described in detail with reference to the attached drawings.

Figure 2:
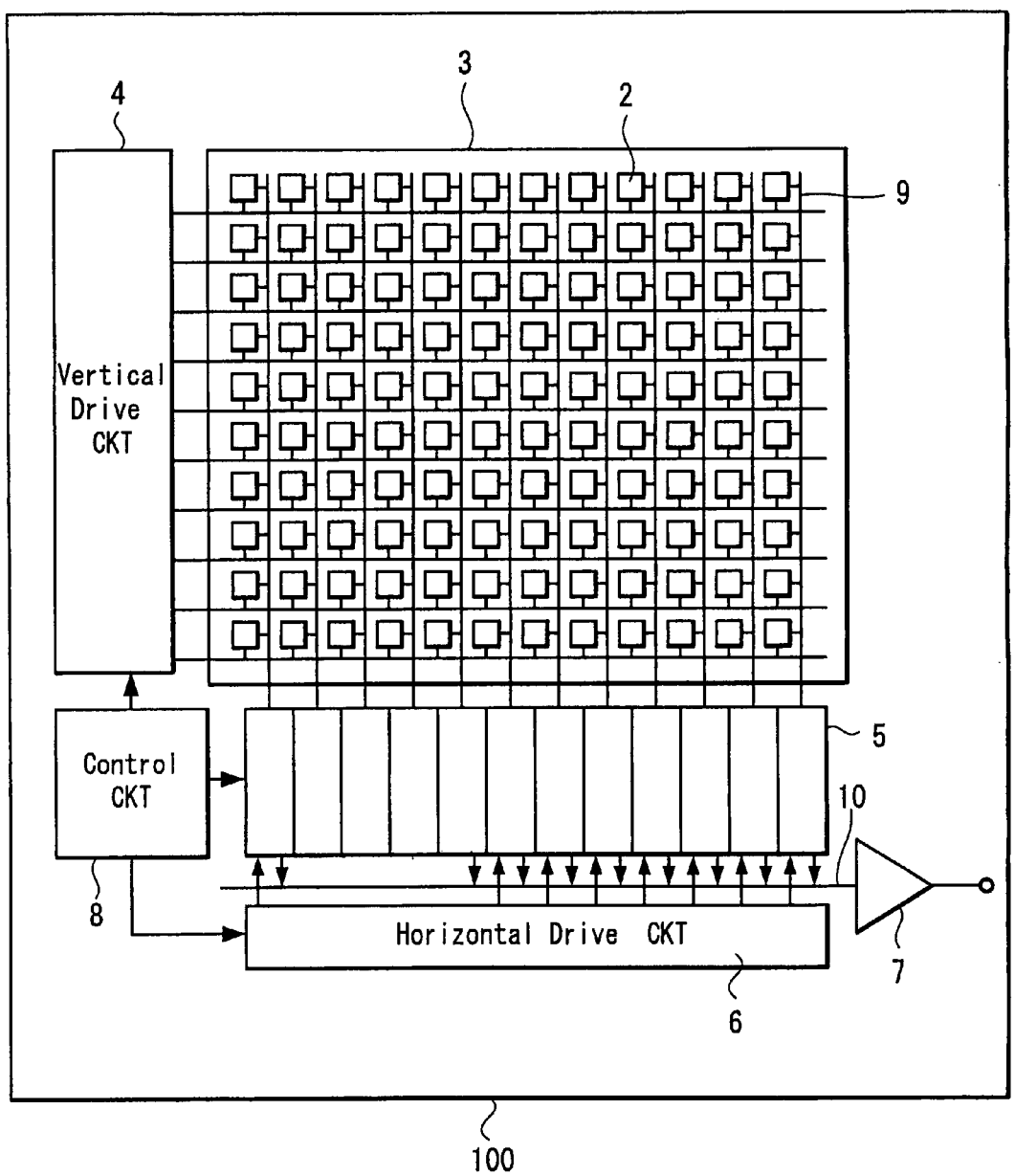
FIG. 2 is a schematic diagram showing an arrangement of a solid-state imaging device according to an embodiment of the present invention.

FIG. 2 illustrates a schematic configuration of a CMOS solid-state imaging device (image sensor) as an embodiment of the solid-state imaging device of the present invention. The solid-state imaging device 1 according to the embodiment includes: an imaging region 3 in which a plurality of pixels 2 each having a photoelectric converting portion is regularly arranged in a two dimensional array; a vertical drive circuit 4 provided as a peripheral circuit of the imaging region 3; a column signal-processing circuit 5; a horizontal drive circuit 6; an output circuit 7; a control circuit 8; and the like on a semiconductor substrate, such as a silicon substrate.

The control circuit 8 generates a clock signal, a control signal, and so on to be referenced to operations of the vertical drive circuit 4, the column signal-processing circuit 5, the horizontal drive circuit 6, and so on. Subsequently, the control circuit 8 inputs the signals into the vertical drive circuit 4, the column signal-processing circuit 5, the horizontal drive circuit 6, and so on, respectively.

The vertical drive circuit 4 includes, for example, a shift resister. The vertical drive circuit 4 selectively scans the respective pixels 2 in the imaging region 3 one-line at a time sequentially in a vertical direction. Then, through a vertical signal line 9, the vertical drive circuit 4 supplies the column signal-processing circuit 5 with a pixel signal generated in a photoelectric converting portion (photodiode) 21 of each pixel on the basis of signal charge in response to light intensity received.

The column signal-processing circuit 5 is arranged, for example, on each column of the pixels 2. The circuit 5 performs signal processing, such as CDS or signal amplification, for removing noise (i.e., removing specific pattern noises inherent in the pixels 2) from each pixel column using signals from black standard pixels, which are formed around an effective pixel region but not shown in the figure. A horizontal selecting switch (not shown) is provided on an output stage of the column signal-processing circuit 5 to be connected between the circuit and the horizontal signal lines 10.

The horizontal drive circuit 6 includes, for example, a shift resister and sequentially outputs horizontal scanning pulses to select the respective column signal-processing circuits 5 in order, thereby allowing each of the column signal-processing circuits 5 to output a pixel signal to the horizontal signal line 10.

The output circuit 7 performs signal processing on signals sequentially supplied from the respective column signal-processing circuits 5 through the horizontal signal line 10.

According to the present embodiment, furthermore, the unit pixel 2 specifically includes two gate portions between the photoelectric converting portion and the floating diffusion portion. A first gate portion on the side of the photoelectric converting portion is provided for charge accumulation, while a second gate portion on the side of the floating diffusion portion is provided for charge readout (i.e., for transfer gate).

Figure 3:
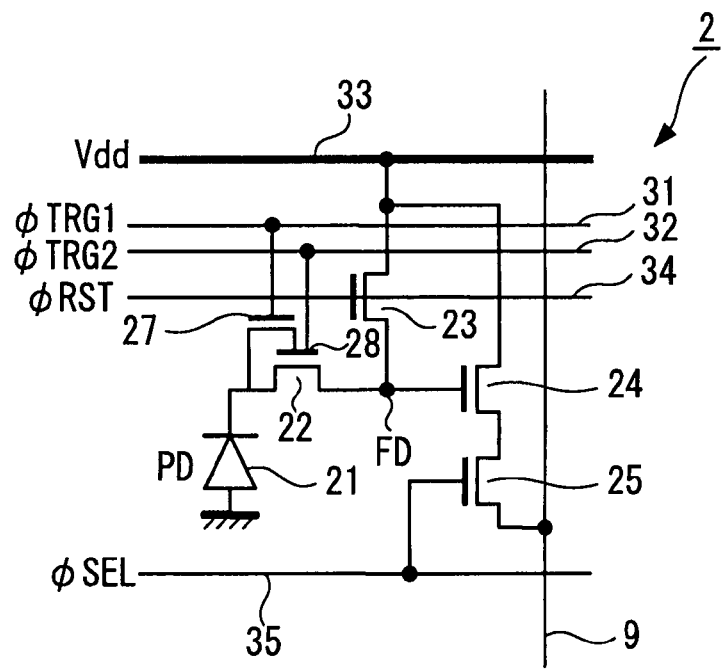
FIG. 3 is an equivalent circuit diagram showing an example of a unit pixel of the solid-state imaging device according to an embodiment of the present invention.

FIG. 3 illustrates an equivalent circuit of an example of the pixel 2. The pixel 2 may include a photodiode 21 constituting the photoelectric converting portion and a plurality of MOS transistors forming a charge converting portion for converting charge generated by photoelectric conversion in the photodiode 21 into a pixel signal. The plurality of MOS transistors may be n-channel MOS transistors including: a transfer transistor 22 having two gate electrodes 27, 28, which will be described later in detail; a reset transistor 23; an amplification transistor 24; and a selection transistor 25.

The photodiode 21 carries out photoelectric conversion to generate photo-charge (in the present embodiment, electron) corresponding to the amount of light received. The cathode of the photodiode 21 is connected to the gate of the amplification transistor 24 via the transfer transistor 22. A node electrically linked to the gate of the amplification transistor 24 is referred to as a floating diffusion portion (FD). The floating diffusion portion FD includes the drain region of the transfer transistor 22 as represented by the cross-sectional structure described below.

The transfer transistor 22 is connected between the cathode of the photodiode 21 and the floating diffusion potion FD. The transfer transistor 22 includes a first gate electrode 27 and a second gate electrode 28. A first gate pulse φTRG1 is applied to the first gate electrode through a first wiring 31 to turn the first gate portion on, thereby forming a charge accumulation region below the first gate electrode 27. A second gate pulse (substantial transfer pulse) φTRG2 is applied to the second gate electrode 28 (substantial transfer gate electrode) through a second wiring 32 (substantial transfer wiring) to turn the second gate portion on, thereby transferring charge below the photodiode 21 and the first gate portion to the floating diffusion portion FD. In this case, preferably, the first gate pulse φTRG1 may have the same voltage level as that of the second gate pulse φTRG2. As far as they have the same level, any additional electric source may not be desired. Alternatively, the second gate pulse φTRG2 may be a pulse having a different voltage level.

The drain of the reset transistor 23 is connected to a pixel power supply (Vdd) line 33 and the source thereof is connected to the floating diffusion portion FD. The reset transistor 23 turns on when a reset pulse φRST is applied to the gate thereof via a reset wiring 34. In advance of transferring signal charge from below the photodiode 21 and the first gate portion to the floating diffusion portion FD, the floating diffusion portion FD is reset by emptying the charge of the floating diffusion portion FD to the pixel power source line 33.

The amplification transistor 24 includes a gate connected to the floating diffusion portion FD and a drain connected to the pixel power source 33. The amplification transistor 24 outputs the electric potential of the floating diffusion portion FD at a reset level after resetting the floating diffusion portion FD by the reset transistor. Subsequently, the amplification transistor 24 outputs the electric potential of the floating diffusion portion FD at a signal level after transferring the signal charge by the transfer transistor 22.

The selection transistor 25 may include a drain connected to a source of the amplification transistor 24 and a source connected to the vertical signal line 9. The selection transistor 25 turns on when a selection pulse φSEL is applied to the gate thereof via a selection wiring 35 and makes the pixel 2 in a selective state to relay an output signal from the amplification transistor 25 to the vertical signal line 9.

Wirings in the lateral direction including the first gate wiring 31, the second gate wiring 32, the reset wiring 34, and the selection wiring 35 are common to the pixels on the same line and controlled from the vertical drive circuit 4.

Alternatively, the selection transistor 25 may be connected between the pixel power source wiring 33 and the drain of the amplification transistor 24. In addition, even though the pixel includes four transistors in the above embodiment, the selection transistor may be omitted to form the pixel including three transistors.

Figure 4:
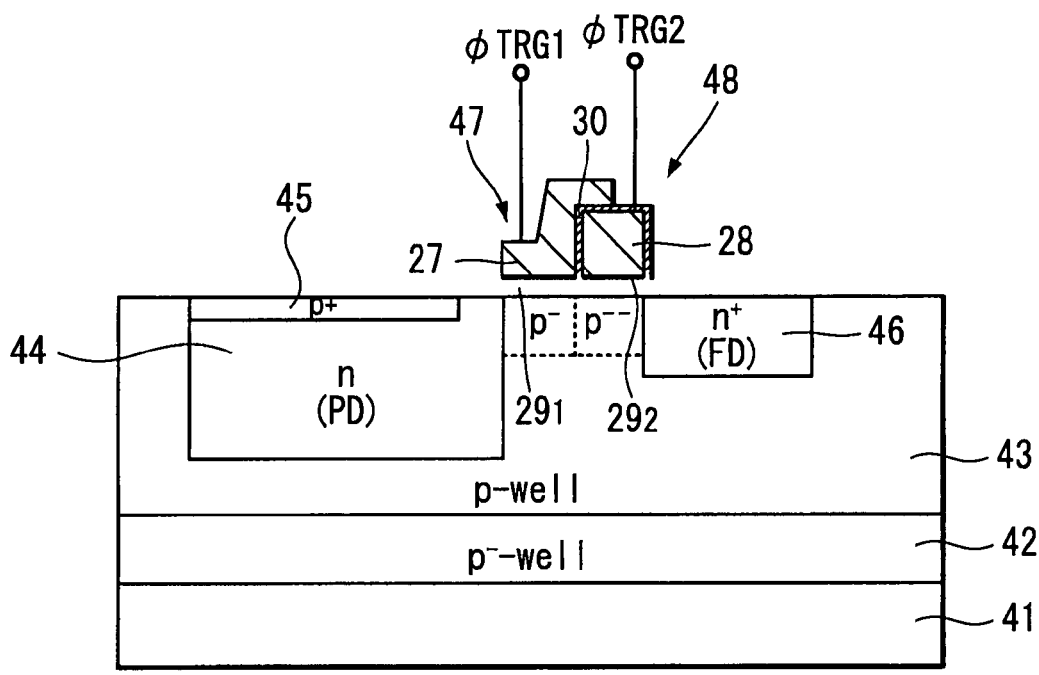
FIG. 4 is a cross-sectional view of a main portion showing the example of the unit pixel of the solid-state imaging device according to an embodiment of the present invention.

FIG. 4 is a schematic cross-sectional view of the substantial part of the pixel 2. According to the present embodiment, the pixel 2 includes a first-conductive type, that is, an n-type silicon substrate 41, and a second-conductive type, that is, a p-type first semiconductor well region (or referred to as a p-type sensor well region) 42 formed thereon. Further, the pixel 2 includes a p-type second semiconductor well region 43, in which the photodiode (PD) 21 and a plurality of MOS transistors (the figure only illustrates the transfer transistor 22) are formed. The photodiode 21 is formed as a hole accumulation (HAD) sensor that includes an n-type charge accumulation region 44 having an n-type semiconductor region where charges are accumulated and a p+ accumulation layer 45 on the surface of the region 44.

On the other hand, the transfer transistor 22 is formed between an n-type semiconductor region 46 (corresponding to a drain) provided as the floating diffusion portion FD and the n-type charge accumulation region 44 (corresponding to a source) of the photodiode 21. The transfer transistor 22 includes: a first gate portion 47 having a first gate electrode 27 formed through a gate insulating film $29_1$, and a second gate portion 48 having a second gate electrode 28 formed through a gate insulating film $29_2$. In other words, the first gate portion 47 is formed on the side of the photodiode 21, while the second gate portion 48 is formed on the side of the floating diffusion FD. Both the gate portions 47 and 48 are arranged so that they come close to each other without having a diffusion region (capacity) between them.

The first gate electrode 27 and the second gate electrode 28 may form a two-layer structure made of polycrystalline silicon films. In other words, the second gate electrode 28 is an electrode film provided as a first layer and the first gate electrode 27 is another electrode film provided as a second layer partially covering the first-layer electrode film. The first gate electrode 27 and the second gate electrode 28 are electrically insulated from each other with an insulating film 30 (such as an oxide film) between them.

The first gate portion 47 and the second gate portion 48 are formed such that a threshold below the first gate portion is higher than a threshold below the second gate portion 48. For instance, in the case where the potential of the first gate pulse φTRG1 applied to the first gate electrode 27 is equal to that of the second gate pulse φTRG2 applied to the second gate electrode 28, the impurity concentration of a p-type region below the first gate electrode 27 is made higher than that of a p-type region below the second gate electrode 28, thereby allowing the threshold below the first gate portion 47 to be higher than the threshold below the second gate portion 48.

Furthermore, for example, in the case where the impurity concentration of the p-type region below the first gate electrode 27 is equal to that of the p-type region below the second gate electrode 28, the difference between the above thresholds may be retained by extending the gate length of the second gate portion 48 larger than that of the first gate portion 47.

In the unit pixel, the overflow drain is formed in the vertical direction. Here, the threshold defined between the photodiode and the semiconductor well region in the vertical direction, that is, the overflow level of the p-type semiconductor well region is kept constant.

Figure 5:
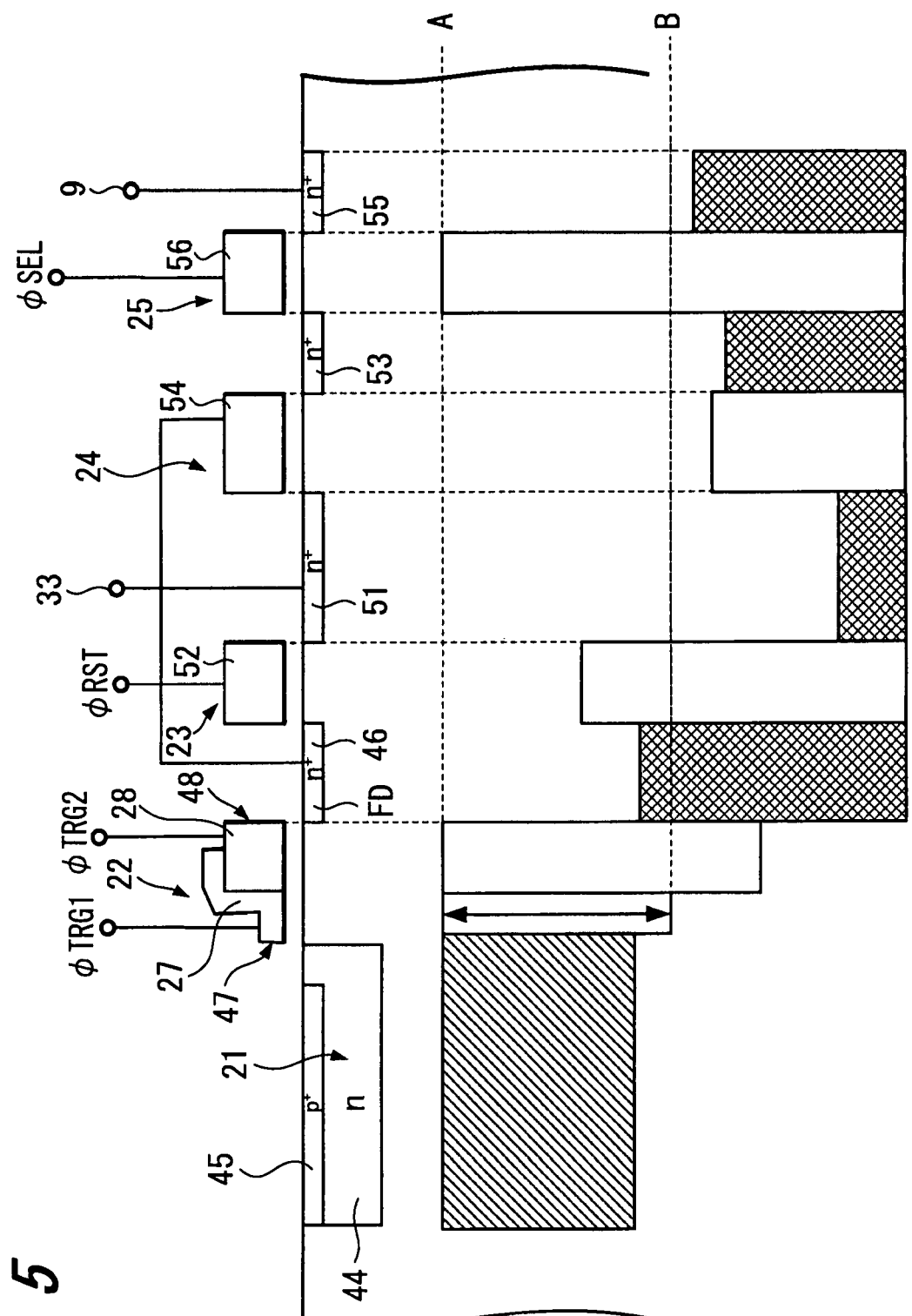
FIG. 5 is a potential diagram of the example of the unit pixel of the solid-state imaging device according to an embodiment of the present invention.

FIG. 5 represents potentials of the respective regions of the pixel 2 according to the present embodiment. FIG. 5 illustrates the reset transistor 23 including n-type semiconductor regions 46, 51 and a reset gate electrode 52, the amplification transistor 24 including an n-type semiconductor regions 51, 53 and an amplification gate electrode 54, and a selection transistor 25 including n-type semiconductor regions 53, 55 and a selection gate electrode 56, in addition to the photodiode 21 and the transfer transistor 22.

Next, the operation of the solid-state imaging device 1 according to the present embodiment will be described. At first, after releasing an electronic shutter, charge accumulation is initiated and charges are then accumulated in the photodiode 21. Subsequently, after the accumulated charges reach to a saturated amount, which can be defined by the overflow level of the photodiode 21, the first gate pulse φTRG1 is applied to the first gate electrode 27 in the middle of the charge accumulation period to turn on the first gate portion 47 on the side of the photodiode 21. Turn-on of the first gate portion 47 allows a substantial increase in capacity of the photodiode 21 and then the potential of the first gate portion 47 shifts from level A to level B in FIG. 5, thereby causing a substantial increase in charge accumulation capacity of the photodiode 21. In other words, potential provided for charge accumulation is formed below the first gate portion 47 and the overflow level of the photodiode 21 substantially increase, thereby causing an increase in charge accumulation capacity (i.e., a saturated amount of charge accumulated).

Subsequently, after completing the charge accumulation period, the reset transistor 23 is turned on by applying a reset pulse φRST thereto before reading the signal charge, thereby resetting the floating diffusion portion FD to the voltage of the pixel power source. The potential of the floating diffusion portion FD after resetting is outputted to the vertical signal line 9.

Next, a second pulse φTRG2 is applied to the second gate electrode 28 to turn on the second gate portion 48 on the side of the floating diffusion portion FD, thereby reading out the charge of the photodiode 21 to the floating diffusion portion FD. The charge read in the floating diffusion portion FD is converted into a pixel signal and then outputted to the vertical signal line 9.

Both the prior reset potential and the subsequent pixel signal are subjected to the CDS processing in a CDS-processing circuit of the column signal-processing circuit 5 to remove noises from the signal, followed by output from the output circuit 7 via the horizontal signal line 10. A relationship between light intensity and output signal should have a Knee characteristic, thereby extending a dynamic range. In this case, in other words, the dynamic range can be extended for each pixel.

Figure 6:
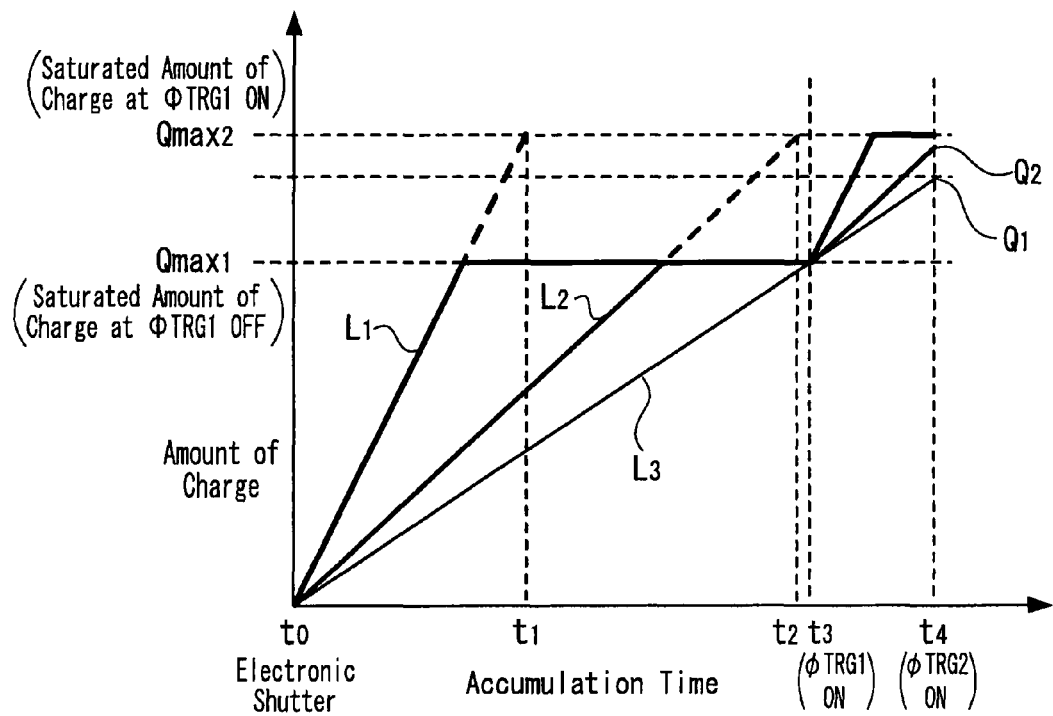
FIG. 6 is a graphical representation showing a characteristic of a pixel on a relationship between time and accumulated charge amount of the solid-state imaging device according to an embodiment of the present invention.
Figure 7:
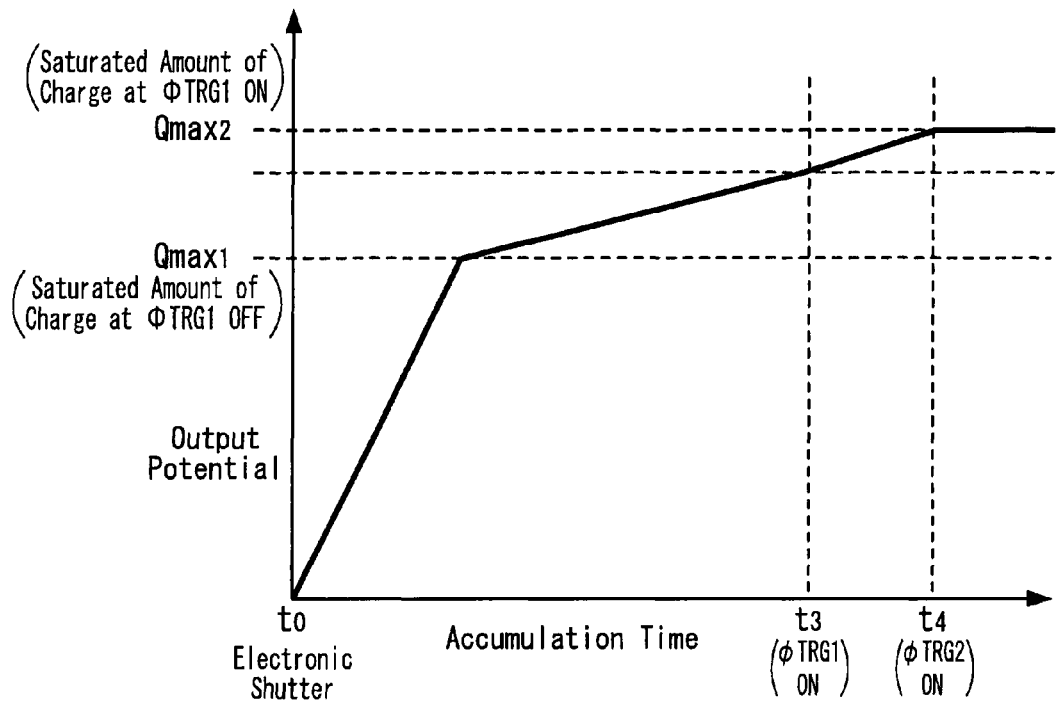
FIG. 7 is a graphical representation showing a characteristic of the pixel on a relationship between incident light intensity and output voltage of the solid-state imaging device according to an embodiment of the present invention.

Referring now to FIGS. 6 and 7, the widening of a dynamic range, which can be obtained by the above operation, will be described. FIG. 6 is a graphical representation of the relationship between the amount of charge accumulated in the pixel and an accumulation time (exposure time) with respect to light intensity. The slope of the line corresponds with the light intensity. Qmax 1 on the vertical axis is a saturated amount of charge accumulated when the first gate portion is turned off (the saturated amount of accumulated charge in the photodiode). Qmax2 on the vertical axis is a saturated amount of charge accumulated when the first gate portion is turned on (i.e., the sum of the saturated amount of charge accumulated in the photodiode and that accumulated in the first gate portion). On the lateral axis, time point t3 represents the time of turning the first gate portion on and time point t4 represents the time of turning the second gate portion on.

At first, an electronic shutter is released at time point t0 to initiate accumulation of charges (electrons) in the photodiode up to an overflow level. The first gate portion on the side of the photodiode is turned on after releasing the electronic shutter, after several tens to several thousands of H (H: horizontal scanning period), or after t3 in the middle of the charge accumulation period. It causes an increase in charge of the capacity of the photodiode and an overflow level thereof then rises. Therefore, charges (electrons) can further be accumulated. Subsequently, at the timing of t4, a second gate portion on the side of the floating diffusion portion FD is turned on, so that the charges can be transferred to the floating diffusion portion FD to extend the dynamic range.

For more detail, if the overflow level is set to Qmax2 from the beginning without raising the level in the middle of the charge accumulation period, a large amount of light is incident on the pixel to cause an increase in accumulated amount of charge as represented by lines L1 and L2 in FIG. 6 and directly changes along the broken lines, thereby saturating at time points t1 and t2, respectively. Therefore, two kinds of the amounts of light corresponding to L1 and L2 are hardly distinguished from each other with output levels of the solid-state imaging device. In contrast, according to the present embodiment, the overflow level is raised from a lower level Qmax1 to a higher level Qmax2 in the middle of the charge accumulation period. Therefore, the respective lines L1 and L2 become lines represented by solid lines. The respective amounts of charge accumulated at the time of output become Qmax2 and Q2 so that the amounts of light can be distinguished on output levels. The straight line 3 corresponds to the amount of charge accumulated without waste, where the amount of charge accumulated becomes Q1 at the time of output. As described above, the dynamic range can be extended.

FIG. 7 is a graphical representation of the relationship between an incident light intensity and output voltage after CDS processing on the straight line L3 shown in FIG. 6.

Figure 8:
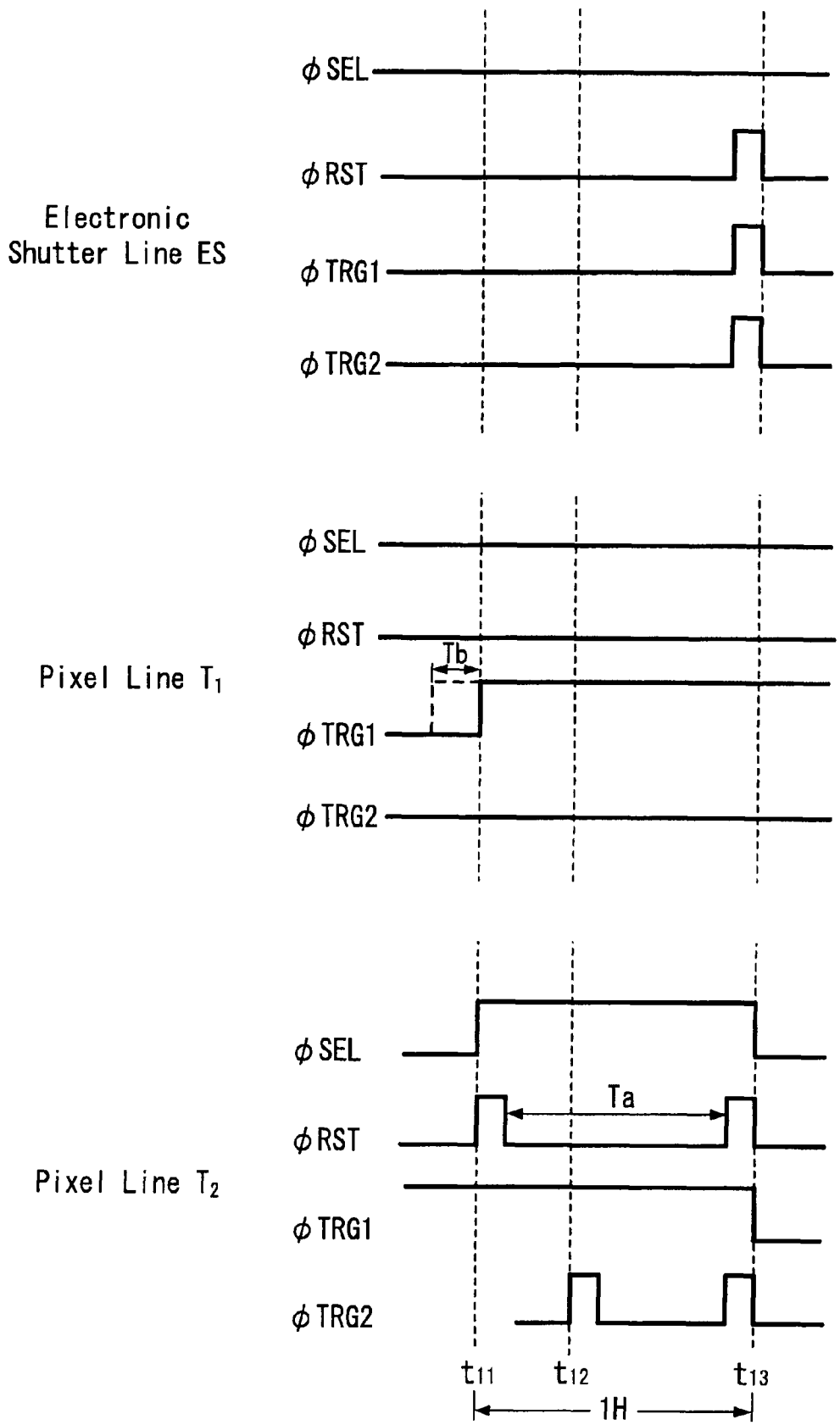
FIG. 8 is a pulse-timing chart showing timings of driving pulses used for explaining an embodiment of the present invention.
Figure 9:
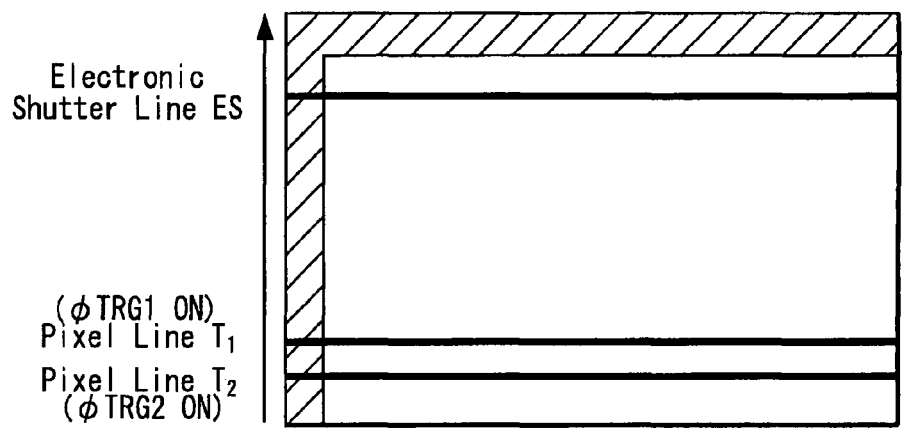
FIG. 9 is a schematic diagram showing pixel lines for explaining the pulse timings in FIG. 8.

Next, the operation according to the present embodiment will further be described with reference to FIGS. 8 and 9. FIG. 8 is a pulse-timing chart that illustrates timings of the respective pulses φSEL, φRST, φTRG1, and φTRG2 of a certain one horizontal scanning period (1H). As indicated in FIG. 9, the term "certain one horizontal scanning period" means a horizontal scanning period in which the following processes are simultaneously carried out; an electronic-shuttering process on a pixel line ES, a charge-accumulating process on a pixel line T1 where the first gate portion on the side of the photodiode is turned on, and a reading-out process on a pixel line T2 where the second gate portion on the side of the floating diffusion portion FD is turned on.

As shown in FIG. 8, on the pixel line T2, a reset pulse φRST is applied at initial time point t11 in the one horizontal scanning period (1H) to turn the reset transistor 23 on, thereby resetting the floating diffusion portion FD to the potential of the pixel power source. At this time, the selection transistor 25 is in the ON state, the first gate portion 47 is in the ON state, and the second gate portion 48 is in the OFF state. After turning the reset transistor 23 off, during the period until the second gate portion 48 is turned on at time point t12, a pixel signal (dark) at the time of resetting is read out to the CDS circuit of the column signal-processing circuit 5.

At time point t12, a second gate pulse φTRG2 is applied to the gate of the second gate portion 48 to turn the second gate portion 48 on, thereby transmitting a signal charge from the photodiode 21 to the floating diffusion portion FD. At this time, the selection transistor 25 is in the ON state, the first gate portion 47 is in the ON state, and the reset transistor 23 is in the OFF state. After turning the second gate portion 48 on at time point t12, during the period until the next reset transistor 23 is turned on, a pixel signal (bright) in response to a signal charge is read out to the CDS circuit of the column signal-processing circuit 5, followed by carrying out the CDC processing.

While reset transistor 23 turns on immediately before end time point t13 of the one horizontal-scanning period (1H), the second gate portion 48 turns on simultaneously. The selection transistor 25, the reset transistor 23, the first gate portion 47, and the second gate portion 48 are turned off at time point t13.

The period Ta that the selection transistor 25 is in the ON state and the reset transistor 23 is in the OFF state corresponds to the period of carrying out the CDS processing, namely a CDS period.

On the pixel line ES, a reset pulse φRST turns the reset resistor 23 on immediately before time point t13, so that all charges accumulated in the photodiode 21 until then are emptied and the electronic shutter is then released. At this time, the selection transistor 25 is in the OFF state, the first gate portion 47 is in the ON state, and the second gate portion 48 is in the ON state.

On the pixel line T1, a first gate pulse φTRG1 is applied to the first gate portion 47 from time point t11 to turn it on, thereby causing charge accumulation below the first gate portion 47. In this one horizontal-scanning period (1H), the selection transistor 25, the reset transistor 23, and the second gate portion 48 are in the OFF state.

The timing of turning on the first gate portion 47 on the side of the photodiode 21 may be optionally determined after releasing an electronic shutter and before turning the second gate portion 48 on to read out the accumulated charge to the floating diffusion portion FD, as far as the timing does not overlap the CDS period Ta of another pixel line. This is because if such an operation is carried out during the period of reading out another pixel line it will affect on an image quality. Therefore, as represented by the first gate pulse φTRG1 on the pixel line T1 of FIG. 8, it is preferable that the timing of applying the first gate pulse φTRG1 is within a period Tb as represented by the dashed line including time point t11 and the previous period.

Figure 1:
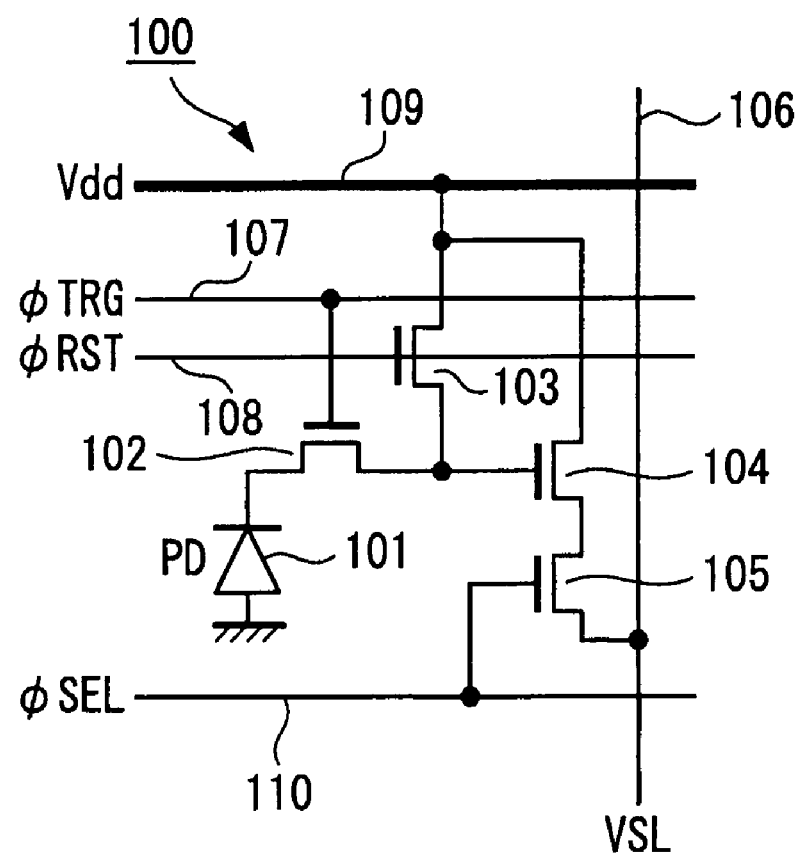
FIG. 1 is an equivalent circuit diagram showing an example of a related-art unit pixel.

It should be noted that the pulse timing for the related-art unit pixel shown in FIG. 1 corresponds to the case in which a sequence of the first gate pulses φTRG1 of the first gate portion 47 in FIG. 8 is absent.

In the solid-state imaging device and the method of driving the solid-state imaging device according to the above-mentioned embodiment, the gate of the transfer transistor 22 between the photodiode (PD) 21 and the floating diffusion portion FD of each pixel includes two gate portions, the first gate portion 47 having the gate electrode 27 and the second gate portion 48 having the gate electrode 28. The first gate portion 47 is turned on in the middle of charge accumulation in each pixel, so that the overflow level can be substantially increased. Consequently, the dynamic range of each pixel can be extended because a saturated amount of charge accumulated increases.

In other words, according to the present embodiment, while the overflow drain is kept at a constant value, the threshold defined between the photodiode 21 and the p-type semiconductor well regions 42, 43 in the vertical direction (thickness direction of the substrate), capacity of the photodiode can be raised in the middle of the charge accumulation period of each pixel to extend the dynamic range.

In fact, a method of synthesizing images at the times of short-time accumulation and prolonged-time accumulation, which is one of the related art methods for extending the dynamic range, may obtain the characteristic on the relationship between light intensity and output shown in FIG. 7 after an image synthesis with an external DSP processing as described above. In contrast, according to the present embodiment, the characteristic on the relationship between light intensity and output shown in FIG. 7 can be obtained before the CDS processing, thereby extending the dynamic range.

It should be noted that the CDS processing is carried out in the column circuit portion. According to the present embodiment, a signal synthesis can be performed in the pixel array portion located upstream of the column circuit.

According to the embodiment, the threshold below the first gate portion 47 on the side of the photodiode 21 is made higher than that below the second gate portion 48 on the side of the floating diffusion portion FD. Thus, when both the first gate portion 47 and the second gate portion 48 are turned on, the potential of the second gate portion 48 becomes deeper than the potential of the first gate portion 47 as shown in FIG. 5. Therefore, it becomes easy to read out a charge from the photodiode 21 to the floating diffusion portion FD.

The thresholds of the first and second gate portions can be controlled, for example, by changing ion-implantation conditions to make the impurity concentration of the semiconductor region of the first gate portion higher than that of the second gate portion. Such difference in threshold facilitates the charge readout from the photodiode 21 to the floating diffusion portion FD with a difference of potential levels. In such configuration, when independent gate pulses φTRG1 and φTRG2 are applied to the first gate portion and the second gate portion respectively, the threshold difference can also be made even if voltage levels of the respective gate pulses are equalized. Therefore, it is useful to simplify the configuration of a power source circuit with a small number of pixel power sources as the number of pixel sources needed may be reduced.

In addition to the above configuration, the gate length of the second gate portion 48 may be longer than that of the first gate portion 47 to certainly turn the second gate portion 48 off.

Further, according to the embodiment, the first gate electrode 27 and the second gate electrode 28 may be formed of a two-layer film, where the second gate electrode 28 may be formed as a first-layer electrode film and the first gate electrode 27 may be formed as a second-layer electrode film partially covering the second gate electrode 28 to certainly turn the second gate portion 48 off. In this case, a threshold difference is provided so that the impurity concentration below the first gate portion 47 is higher than that below the second gate portion 48 to facilitate the charge readout to the floating diffusion portion FD.

Furthermore, according to the embodiment, a fixed pattern noise can be reduced. Besides, a readout gate terminal leakage current GIDL (Gate-induced drain leakage) in the floating diffusion portion FD can also be reduced.

Further, according to the present embodiment, a circuit area can be made small, compared with a related art method of extending a dynamic range by raising an overflow level with ternary drive of a readout voltage.

Figure 10:
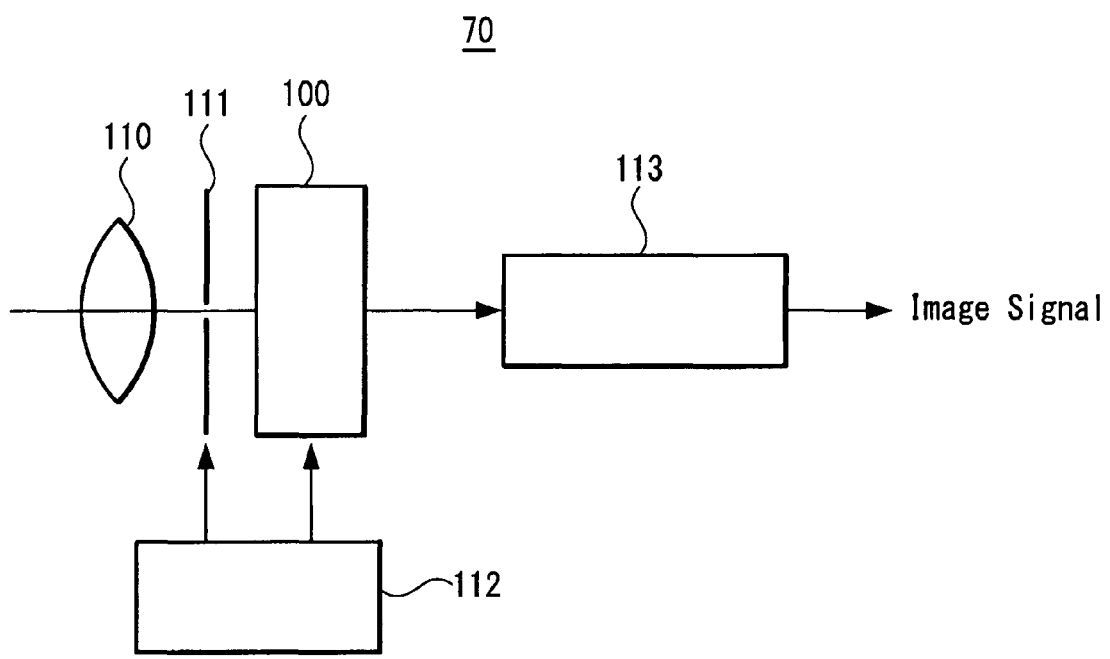
FIG. 10 is a schematic diagram showing an example of a configuration of a camera according to an embodiment of the present invention.

FIG. 10 illustrates an example of configuration of a camera as an embodiment of the present invention. The camera according to the present embodiment includes a semiconductor imaging device 100, an optical system 110, a shutter device 111, a drive circuit 112, and a signal-processing circuit 113.

The optical system 110 is used to form an image of a photographic subject with imaging light (incident light) on the imaging surface of the semiconductor imaging device 100, thereby allowing the semiconductor imaging device 100 to accumulate signal charges therein for a fixed period of time.

The shutter device 111 is responsible for controlling both the light-irradiation period and the shading period for the semiconductor imaging device 100.

The drive circuit 112 supplies driving signals for the transmission operation of the semiconductor imaging device 100 and the shutter operation of the shutter device 111, respectively. A driving signal (timing signal) supplied from the drive circuit 112 allows the semiconductor imaging device 100 to carry out charge transmission. The signal-processing circuit 113 performs various kinds of signal processing. A video signal subjected to the signal processing is recorded in a storage device, such as a memory, or outputted to a monitor.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising
an imaging region including a plurality of pixels arranged, wherein
each of the pixels includes a photoelectric converting portion and a charge converting portion for converting a charge generated by photoelectric conversion into a pixel signal, and
a first gate portion for charge accumulation and a second gate portion for charge readout are formed between the photoelectric converting portion and a floating diffusion portion.

2. A solid-state imaging device according to claim 1, wherein
a gate voltage of the first gate portion and a gate voltage of the second gate portion are defined independently from each other.

3. A solid-state imaging device according to claim 1, wherein
the first gate portion is actuated in the middle of a charge accumulation period of the pixel to increase a saturated amount of charge accumulated in the photoelectric converting portion, and
the second gate portion is actuated after completing the charge accumulation period to read out the charge of the photoelectric converting portion to the floating diffusion portion.

4. A solid-state imaging device according to claim 1, wherein
a threshold below the first gate portion on a side of the photoelectric converting portion is set up higher than a threshold below the second gate portion on a side of the floating diffusion portion.

5. A solid-state imaging device according to claim 4, wherein
a gate electrode of the first gate portion is formed to partially cover a gate electrode of the second gate portion.

6. A solid-state imaging device according to claim 4, wherein
an impurity concentration below the first gate portion is different from an impurity concentration below the second gate portion.

7. A solid-state imaging device according to claim 4, wherein
a gate length of the first gate portion is different from a gate length of the second gate portion.

8. A method of driving a solid-state imaging device including a plurality of pixels each having a photoelectric converting portion and a floating diffusion portion, comprising the steps of:
forming a first gate portion for charge accumulation and a second gate portion for charge readout between the photoelectric converting portion and the floating diffusion portion; and
actuating the first gate portion in the middle of a charge accumulation period of the pixel to increase an overflow level of the photoelectric converting portion and extend a dynamic range.

9. A method of driving a solid-state imaging device according to claim 8, further comprising the steps of:
initiating charge accumulation up to the overflow level of the photoelectric converting portion;
actuating the first gate portion in the middle of the charge accumulation period to increase the overflow level of the photoelectric converting portion and continuing the charge accumulation, and
actuating the second gate portion after completing the charge accumulation period to read out a charge from the photoelectric converting portion to the floating diffusion portion.

10. A method of driving a solid-state imaging device according to claim 8, wherein
the first gate portion is actuated after releasing an electronic shutter but before reading out the accumulated charge at a timing, which is out of a CDS period of a pixel on another line.

11. A camera comprising
a solid-state imaging device that includes an imaging region having a plurality of pixels arranged, wherein
each of the pixels includes a photoelectric converting portion and a charge converting portion for converting a charge generated by photoelectric conversion into a pixel signal, and
a first gate portion for charge accumulation and a second gate portion for charge readout are formed between the photoelectric converting portion and a floating diffusion portion.

12. A method of driving a camera including a solid-state imaging device having a plurality of pixels each including a photoelectric converting portion and a floating diffusion portion, comprising the steps of:
forming a first gate portion for charge accumulation and a second gate portion for charge readout between the photoelectric converting portion and the floating diffusion portion; and
actuating the first gate portion in the middle of a charge accumulation period of the pixel to increase an overflow level of the photoelectric converting portion and extend a dynamic range.

* * * * *